Patented Apr. 12, 1932

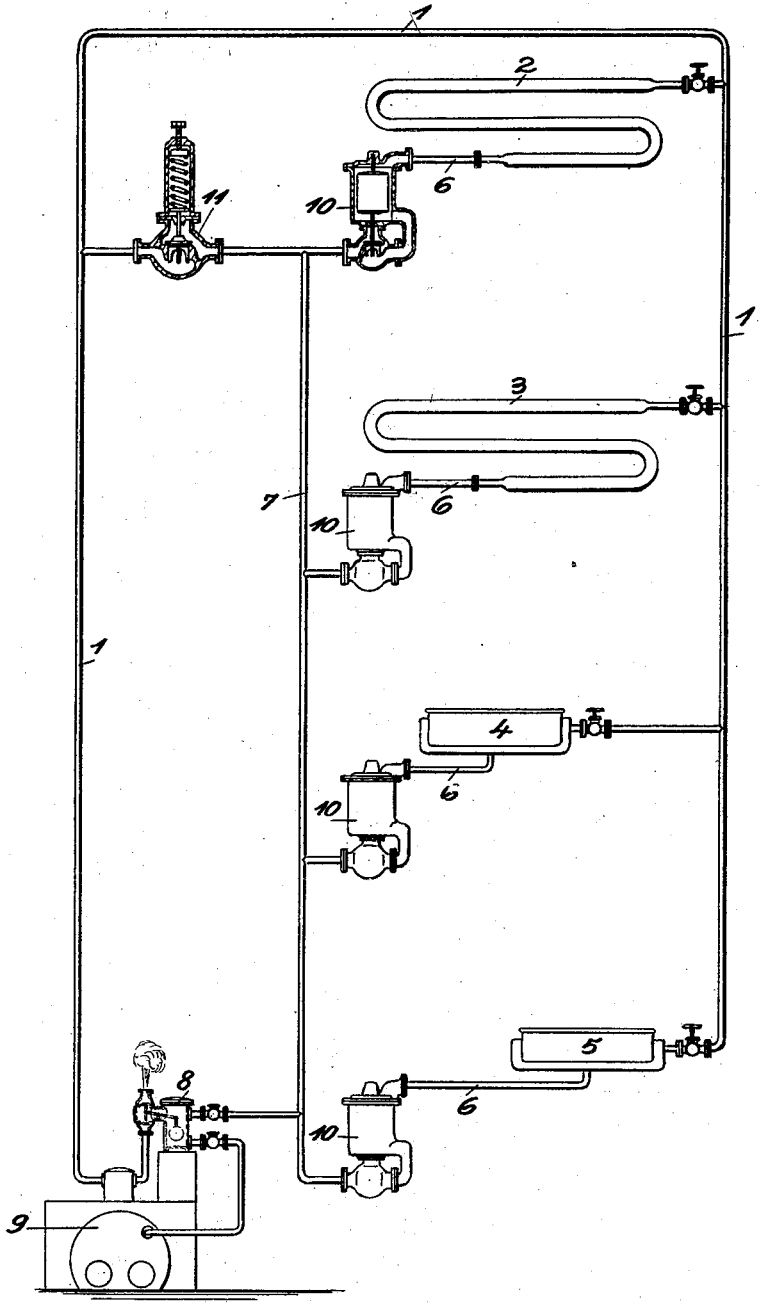

1,853,820

UNITED STATES PATENT OFFICE

HUBERT KRANTZ, OF AACHEN, GERMANY

STEAM HEATING SYSTEM

Application filed June 21, 1928, Serial No. 287,229, and in Germany June 27, 1927.

This invention relates to steam heating systems comprising a plurality of mean or high pressure heating plants which work at different pressures and the water of condensation of which is led into one common condensate collecting pipe, which is shut off with relation to the atmosphere and from which the water is either returned to the boiler or otherwise utilized. In the known heating systems of this kind difficulties arise owing to the difference of pressure in the several heating plants and the condensate collecting pipe. The difference of pressure between the several heating plants is either due to the variations of pressure of the steam used or to the varying reduction of pressure in the several plants. It has been proposed in heating systems to arrange at the exit end of each heating coil a device for automatically reducing the different pressures to one uniform pressure which is somewhat higher than the pressure in the condensate collecting pipe. These known devices include a check valve which is loaded by a float the weight of which is more or less balanced by the buoyancy of the water accumulating in the device. When the float is wholly immersed in water, no reduction or only the minimum reduction of pressure takes place. The reduction of pressure is greatest when the float does not immerse in the water at all. This known regulation of pressures therefore entirely depends on the weight of the float. As the required range of pressure regulation cannot be accurately ascertained in advance, especially in cases where many heating plants empty into one and the same collecting pipe for the water of condensation, the following drawbacks are entailed. The floats are either chosen for too great a range of pressure, i. e. they are made too heavy, in which case the pressure is reduced more than required and water hammers are liable to occur, or the floats are chosen for too small a range of pressure, i. e. they are made too light, in which case a perfect draining of all plants can no longer be attained.

Now, the invention has for its object to avoid the said drawbacks and to provide a mean or high pressure steam heating system in which the drop of pressure between the live steam pipe and the condensate collecting pipe is automatically held at a definite maximum limit by a centrally arranged adjustable device, which may in itself be of a well-known character and, for example, may be a variably loaded valve arranged in the collecting pipe and adapted to automatically admit steam into the collecting pipe when the pressure in the same drops below a predetermined amount.

The water of condensation may be led from the several heating plants into the collecting pipe by any well-known devices.

The accompanying drawing diagrammatically illustrates, by way of example, a heating system constructed in accordance with the invention.

1 designates the steam pipe to which are connected two room heating plants 2 and 3 and two boiling tanks 4 and 5. The reduction of pressure in the heating plants and the boiling tanks is unequal. In the former the reduction of pressure depends on the length and diameter of the heating tubes and on the temperature of the room, while in the latter it depends on whether the material to be boiled has to be brought to the boiling temperature or whether the temperature already reached has only to be kept up. The water of condensation is led through the pipes 6 to the collecting pipe 7 and returned by the device 8 to the boiler 9. Arranged at the end of each pipe 6 is a device 10 of well-known construction controlling the leading off of the water of condensation. 11 is a steam admission valve which is connected with the condensate collecting pipe 7 and the live steam pipe 1. The load on the valve is variable. Its construction may be of a well-known kind; it may for instance be a spring-weighted check valve.

The operation of the heating system is as follows. It is assumed that the pressure above atmospheric in the steam pipe 1 is 6 atmospheres and it is further assumed, that in the case of the greatest output, the pressure at the end of the heating plant 2 is 4.2 atmospheres, that at the end of the heating plant 3 it is 3.9 atmospheres and that at the boiling tanks 4 and 5 it is 3.7 atmospheres. Under these circumstances, the automatic steam admission valve 11 is adjusted in such a manner that it reduces the pressure of the steam flowing through it by a little more than (6—3,7) =2.3 atmospheres above atmospheric. When the difference of pressure between the steam pipe and the condensate collecting pipe becomes greater, live steam is automatically admitted by the valve 11 into the collecting pipe. When the difference of pressure becomes smaller the admission of steam through the valve 11 is automatically cut off. A perfect draining of the entire system is thus secured in a simple manner. At the same time losses of heat and disturbances of working and more particularly water-hammers in the piping are avoided. The collecting pipe 7 for the water of condensation is preferably insulated to prevent radiation of heat.

Instead of supplying steam to the collecting pipe there may also be supplied air.

The regulation of the drop of pressure may also be effected in another manner, such as for example by means of a valve which is loaded by a diaphragm or piston and which allows water to flow from the condensate collecting pipe to the return device or the like only when the difference of pressure between the live steam pipe and the condensate collecting pipe has fallen to a predetermined amount.

In case it is desired to have no back pressure whatever when the system is started, the regulation may for instance be effected by the aid of a clockwork in such a manner that the pressure in the condensate collecting pipe is raised only gradually, which means that the difference of pressure between the live steam pipe and the condensate collecting pipe is only gradually reduced by the admission of steam or the like into the collecting pipe.

Having thus described my invention, what I claim as new and desire to secure by Letters-Patent, is:—

1. In a steam heating system, a main open to a source of steam under pressure, a plurality of heating units connected to the steam main and using steam at different pressures, a condensate pipe common to the heating units and closed against the atmosphere, a pressure regulating device interposed between each heating unit and the condensate pipe, a by-pass connecting the steam main and the condensate pipe, and means in the by-pass to automatically control communication between the steam main and the condensate pipe in accordance with the difference in pressure between that of the steam source and that in the condensate pipe.

2. In a steam heating system, a main open to a source of steam under pressure, a plurality of heating units connected to the steam main and using steam at different pressures, a condensate pipe common to the heating units and closed against the atmosphere, a regulating device interposed between each heating unit and the condensate pipe, a by-pass connecting the steam main and the condensate pipe, and an automatically controlled cut-off in the by-pass designed to admit steam from the steam main into the condensate pipe when and as long as the pressure in this pipe is below a predetermined maximum.

3. In a steam heating system, a main open to a source of steam under pressure, a plurality of heating units connected with the steam main and using steam at different pressures, a condensate pipe common to the heating units and closed against the atmosphere, regulating means adjusted for a predetermined maximum drop of pressure and interposed between each heating unit and the condensate pipe, a by-pass connecting the steam main and the condensate pipe, and an automatically controlled cut-off in the by-pass designed to admit steam into the condensate pipe when and as long as pressure in this pipe is below a predetermined upper limit within the said maximum drop of pressure.

In testimony whereof I have signed my name to this specification.

Dr. HUBERT KRANTZ.